May 16, 1933.   W. G. MYLIUS ET AL   1,909,116
MAXIMUM DEMAND METER
Filed July 14, 1927
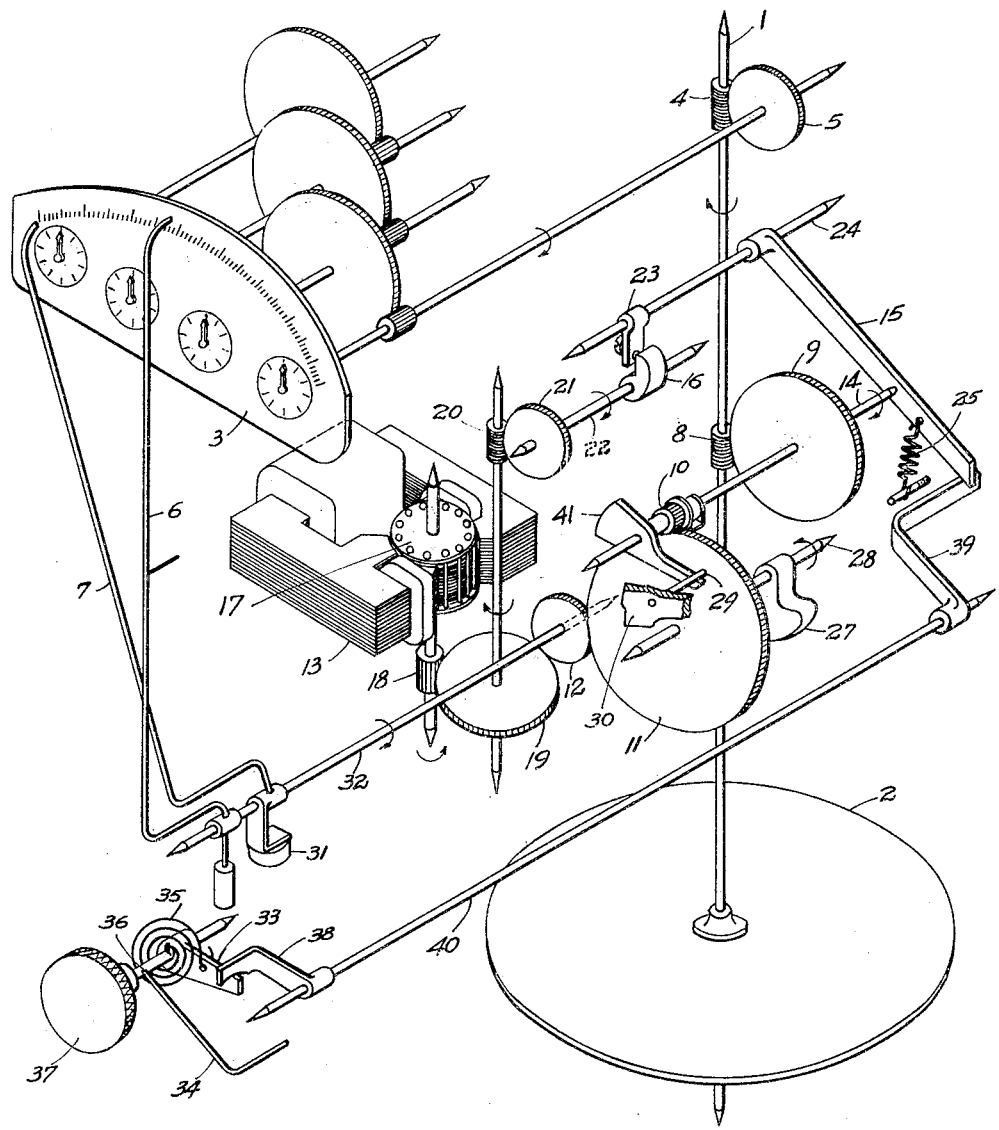
INVENTORS
Walter G. Mylius
Argyle R. Rutter &
Robert H. Lewis.
BY
ATTORNEY Patented May 16, 1933

1,909,116

UNITED STATES PATENT OFFICE

WALTER G. MYLIUS, OF WILKINSBURG, ARGYLE R. RUTTER, OF FOREST HILLS, AND ROBERT H. LEWIS, OF WILKINSBURG, PENNSYLVANIA, ASSIGNORS TO WESTINGHOUSE ELECTRIC AND MANUFACTURING COMPANY, A CORPORATION OF PENNSYLVANIA

MAXIMUM DEMAND METER

Application filed July 14, 1927. Serial No. 205,554.

Our invention relates to apparatus for measuring the total amount of a quantity such as power in an electrical circuit and for indicating the maximum demand of such power for a given predetermined interval of time.

Our invention resides in apparatus of the character referred to, comprising a deflection member for indicating the maximum demand of a quantity. The said member is adapted to indicate the maximum travel of a pointer that is periodically driven by an electrical measuring instrument such as a watthour meter for predetermined equal intervals of time.

It is a purpose of our invention to provide, in an apparatus of the above indicated character, means for resetting the deflection indicator and the driven pointer at any time, regardless of the position or operation of either the deflection indicator or the driven pointer.

It is further characteristic of our invention for the above indicated purpose that the driven pointer and indicating pointer may be reset to an initial predetermined zero in such manner that the gear wheels of the gear train are in proper mesh and have a proper tension in their teeth to prevent any lost motion between the first driving gear and the last driven pointer.

Our invention resides in an apparatus of the character hereinafter described and claimed.

For an illustration of a mode of practicing our invention and a form our apparatus may take, reference is to be had to the accompanying drawing, in which, The figure is a diagrammatic, distorted, perspective view of apparatus embodying our invention.

Referring to the drawing, 1 is the shaft of an electrical measuring instrument, in this case a watthour meter, having a disk 2 that rotates in accordance with the magnitude of the power traversing an electrical circuit (not shown). The total number of revolutions of the disk 2 is registered in the usual manner by means of an integrating device 3 that is suitably geared to the shaft 1 of the watthour meter through a worm gear 4 and a gear wheel 5.

The maximum demand portion of the meter comprises a deflection indicator 6 that is advanced by a driven pointer 7 to indicate the maximum deflection attained by the pointer 7 for a predetermined interval of time. The pointer 7 is driven for such predetermined intervals of time by the rotation of the shaft 1 of the watthour meter through a worm gear 8, gear wheel 9, gear wheel 10, gear wheel 11 and gear wheel 12.

A timing motor 13, periodically disconnects the gear wheel 9 from the worm wheel 8 and permits the driven pointer 7 to be returned to zero. Such periodic disconnection may be effected in any well known manner. Thus, for example, the shaft 14 of the gear wheel 9 may be pivoted on an arm 15 in such manner that the arm 15 is periodically actuated to disengage the gear wheel 9 from the worm 8 by the rotations of a cam 16 that is driven at a constant predetermined speed of rotation by the armature 17 of the timing motor 13 through a gear wheel 18, gear wheel 19, worm gear 20 and gear wheel 21 that is mounted on a shaft 22 of the cam 16. An adjustable member 23 may be mounted on the shaft 24 of the arm 15 to transmit motion from the cam to the shaft 14 and the gear wheel 9.

A small spring 25 biases the lever 15 in such manner that the gear wheel 9 is normally held in proper contact engagement with the worm gear 8.

The timing motor 13 rotates continuously at a constant speed and as pointed out above disconnects the drive between the watthour meter and the driven pointer 7 at the end of predetermined intervals of time such as every fifteen minutes. The driven pointer 7 advances the deflection indicator 6 to a position representing the maximum travel of the pointer 7 for a predetermined given interval of time. The deflection indicator 6 is adapted to be frictionally held in any given position as is well known in the art.

A particularly novel feature of our invention involves an arrangement for distributing the weighted members for returning the driven pointer 7 to a predetermined initial position at the end of the time intervals in such manner that the gear teeth of the driving gears are in proper mesh and have exactly the correct tension for driving the pointer 7 especially at the beginning of the time interval. Heretofore an injudicious disposition of the weights for returning the driven pointer back to zero resulted in a loosening of the tension between the teeth of the gear wheels so that the disk 2 of the watthour meter made several revolutions before the pointer 7 moved, because of such lost motion in the gear train. It is characteristic of our invention that such lost motion is substantially entirely eliminated and the pointer 7 starting from an initial position is moved immediately upon rotation of the disk 2.

For carrying out our invention in accordance with such purpose, we mount a weight 27 on the shaft 28 of the gear wheel 11 in such manner that, when the gear wheel 9 is disconnected from the worm wheel 8, gravity so holds the weight 27 that a lever 41 mounted on the shaft 14 is turned until stopped by a member 29 that is rigidly secured to the frame 30 of the meter. A constant tension is maintained between the gear wheel 10 and the gear wheel 11 by virtue of the fact that the weight 27 is acting against the member 41 that is stopped by the member 29. When the worm wheel 8 begins to turn the gear wheel 9 at the beginning of any time interval, no motion is lost between the gear wheel 10 and the gear wheel 11. Any slight lost motion which may happen to exist between the gear wheel 11 and the gear wheel 12 at the beginning of a time interval is eliminated by means of a relatively light weight 31 mounted on the shaft 32 of the gear wheel 12.

Another particularly novel feature of our invention consists of a reset device for resetting the indicating pointer 6 to a predetermined initial position regardless of what position the driven pointer 7 may happen to be in at the time of resetting. A detailed embodiment of a reset device constructed for the purpose of our invention comprises an engaging member 33, resiliently associated with an engaging member 34 by a spring 35. The engaging member 34 is secured to a shaft 36 that may be mounted in the cover of the meter and may be turned by a conveniently arranged thumbpiece 37. The engaging member 33 is loosely journalled on the shaft 36 in such a manner that its engagement with a lever 38 will not prevent turning of the shaft 36. A motion of the lever 38 is adapted to disconnect the worm gear 9 from the worm wheel 8 by lifting the lever 15 by a lever 39 secured to a shaft 40 on which the lever 38 is secured.

Regardless of the position of either the indicating pointer 6 or the driven pointer 7 they both may be reset to an initial predetermined position at any time by turning the thumbpiece 37 to the left. Such a turning causes the engaging member 33 to lift the lever 38, which disconnects the worm gear 9 from the worm wheel 8 that in turn permits the weight 27 to return the driven member 7 to its initial zero position. A further turning of the thumbpiece 37 causes the engaging member 34 to engage the deflection indicator which latter is pushed back to zero, the driven pointer 7 then being out of the way.

Various modifications may be made in the mechanical arrangement of apparatus for the purpose of our invention as hereinbefore described, without departing from the spirit thereof. We desire that all changes and modifications shall be included within the scope of the appended claims.

We claim as our invention:

1. In combination, a pointer driven and reset through a train of gears, and means including a weight eccentrically disposed on a shaft of said gear train and a stop on the first shaft of the train for returning said driven pointer to its reset position and for keeping said gear train in proper engagement during the time said pointer is being returned to its reset position.

2. A manual pointer-resetting device for a demand meter having a pointer driven periodically through a train of gears, a deflection indicator for indicating the maximum advance of said driven pointer, and means including a weight eccentrically disposed on a shaft of said gear train and a stop on the first shaft of the train for returning said driven pointer to said position and for keeping said gear train in proper engagement, said pointer-resetting device including a plurality of resiliently associated engaging members for severally permitting said driven pointer to return to said position and turning said deflection indicator.

3. A manual pointer-resetting device for maximum-demand meters, embodying driving and driven pointers including, in assembled relation, a turnable member normally out of, but for, engagement with one of said pointers, a second member for disconnecting the drive of the driving pointer, and means associated with said pointers for biasing said second member into position to perform said disconnecting function when said first named member is manually turned to reset the pointers.

4. In combination, movable elements, a gear-wheel train for transmitting motion therebetween, means for connecting the train to one of said elements and disconnecting the same therefrom, means for moving the other element and the wheels of the train after disconnection from said one element, and means preventing back lash between the wheels of the train whereby there is substantially no lost motion to be taken up in the train when the latter is again connected to said one element.

5. In combination, in a meter, driving and driven elements, a gear-wheel train for transmitting motion from the driving to the driven element, means for connecting the train to the driving element and disconnecting the same therefrom, means for moving the driven element and the wheels of the train to preset positions after disconnection from the driving element, and means preventing back lash between the wheels of the train whereby there is substantially no lost motion to be taken up in the train when the latter is again connected to the driving element.

6. In a maximum-demand meter, a movable meter member, a demand element driven thereby, a maximum element driven by the demand element, and means for resetting both elements including means for disconnecting the demand element from the movable meter member and a single operating member operative in one direction for actuating said disconnecting means to disconnect the demand element from the movable meter member and moving the maximum element and in the opposite direction to actuate the disconnecting means for connecting the demand element to the movable meter member.

7. In a maximum-demand meter, a movable meter member, a demand element driven thereby, a maximum element driven by the demand element, and means for resetting both elements including means for disconnecting the demand element from the movable meter member, a single operating member, a dog relatively movably related to the operating member for actuating said disconnecting means, a spring between the operating member and the dog, and a second dog responsive to movement of the operating member for moving the maximum element.

8. In a maximum-demand meter, a movable meter member, a demand element driven thereby, a maximum element driven by the demand element, and means for resetting both elements including means for disconnecting the demand element from the movable meter member, a single operating member operating means responsive to operation thereof in one direction to actuate said disconnecting means to disconnect the demand element from the movable meter member, to move the maximum element and to hold said disconnecting means in disconnecting position while the maximum element is being reset, said operating means being responsive to movement of the operating member in the opposite direction to release said disconnecting means from said held position.

9. In a maximum-demand meter, a movable meter member, a demand element driven thereby, a gear-wheel train between the element and the movable meter member, a maximum element driven by the demand element, and means for resetting both elements including means for disconnecting wheels of said train, an operating member and operating means responsive to a single movement of said operating member in one direction through successive positions for first actuating said disconnecting means to disconnecting position and thereafter moving the maximum element, said operating means being responsive to movement of said operating member in the opposite direction to actuate said disconnecting means to connection position.

10. In a maximum-demand meter, a movable meter member, a demand element driven thereby, a maximum element driven by the demand element, and means including a single operating member operative, in one direction, for disconnecting the demand element from the movable meter member and resetting the maximum element while the demand element is disconnected and, in the opposite direction, for causing the demand element to be connected to the movable meter member after the maximum element has been reset.

11. In a maximum-demand meter, a movable meter member, a demand element driven thereby, a maximum element driven by the demand element, means for disconnecting the demand element from the movable meter member, means for holding the demand element in disconnected position, and means including a single operating member operative in one direction to actuate said disconnecting means to disconnect the demand element from the movable meter member and to actuate said holding means to hold the demand element in disconnected position, said operating member being operative in the same direction to reset the maximum element while the disconnecting means is so held and in the opposite direction to actuate said holding means to release said disconnecting means for connecting the demand element to the movable meter member.

In testimony whereof, we have hereunto subscribed our names this 7th day of July, 1927.

WALTER G. MYLIUS.
ARGYLE R. RUTTER.
ROBERT H. LEWIS.